United States Patent
Chou et al.

(10) Patent No.: US 7,539,830 B2
(45) Date of Patent: May 26, 2009

(54) PORTABLE STORAGE DEVICE CAPABLE OF AUTOMATICALLY RUNNING BIOMETRICS APPLICATION PROGRAMS AND METHODS OF AUTOMATICALLY RUNNING THE APPLICATION PROGRAMS

(75) Inventors: Bruce C. S. Chou, Hsin Chu (TW); Jer-Wei Chang, Hsin Chu (TW)

(73) Assignee: Egis Technology Inc., Taipei (TW)

( * ) Notice: Subject to any disclaimer, the term of this patent is extended or adjusted under 35 U.S.C. 154(b) by 286 days.

(21) Appl. No.: 11/444,393

(22) Filed: Jun. 1, 2006

(65) Prior Publication Data

US 2006/0288182 A1 Dec. 21, 2006

(30) Foreign Application Priority Data

Jun. 3, 2005 (TW) ............... 94118301 A

(51) Int. Cl.
*G06F 12/14* (2006.01)
*G06F 13/00* (2006.01)

(52) U.S. Cl. ............... 711/164; 382/124; 711/112; 726/28

(58) Field of Classification Search ............ 382/124; 711/112, 164; 726/28
See application file for complete search history.

(56) References Cited

U.S. PATENT DOCUMENTS

| 4,582,985 | A | 4/1986 | Löfberg |
| 2001/0000816 | A1* | 5/2001 | Baltar ............... 711/103 |
| 2001/0023375 | A1 | 9/2001 | Shen |
| 2003/0005337 | A1* | 1/2003 | Poo et al. ............ 713/202 |
| 2003/0110389 | A1 | 6/2003 | Elteto |
| 2003/0190061 | A1 | 10/2003 | Chou et al. |
| 2003/0215976 | A1 | 11/2003 | Chou et al. |
| 2004/0046574 | A1 | 3/2004 | Chou |
| 2004/0208345 | A1 | 10/2004 | Chou et al. |
| 2005/0144464 | A1 | 6/2005 | Chiu et al. |
| 2005/0210271 | A1 | 9/2005 | Chou et al. |
| 2005/0244037 | A1 | 11/2005 | Chiu et al. |

FOREIGN PATENT DOCUMENTS

| CN | 1302018 A | 7/2001 |
| CN | 1462410 A | 12/2003 |
| CN | 1567259 A | 1/2005 |
| CN | 1624667 A | 6/2005 |
| CN | 1696960 A | 11/2005 |
| EP | 1 204 079 A1 | 5/2002 |
| GB | 2 387 933 A | 10/2003 |
| WO | WO-02/42887 A2 | 5/2002 |

* cited by examiner

*Primary Examiner*—Tuan V Thai
*Assistant Examiner*—Jae U Yu
(74) *Attorney, Agent, or Firm*—Muncy, Geissler, Olds & Lowe, PLLC

(57) ABSTRACT

A portable storage device capable of automatically running biometrics application programs includes a control module, a storage unit and a biometrics sensor. The control module, in which firmware is stored, is electrically connected to a terminal host, a storage unit and a biometrics sensor. The firmware is configured to divide the storage unit into a plurality of blocks including a biometrics application program block and a private block. The biometrics application program block stores at least one biometrics application program. The firmware enables an operation system of the terminal host to treat the biometrics application program block as an compact disk drive and disables or closes the compact disk drive after automatic running the at least one biometrics application program. The least one biometrics application program guides a user to perform a biometrics identification procedure, and then enables a specific operation.

18 Claims, 7 Drawing Sheets

PORTABLE STORAGE DEVICE CAPABLE OF AUTOMATICALLY RUNNING BIOMETRICS APPLICATION PROGRAMS AND METHODS OF AUTOMATICALLY RUNNING THE APPLICATION PROGRAMS

BACKGROUND OF THE INVENTION

1. Field of the Invention

The invention relates to a portable storage device, and more particularly to a portable storage device capable of automatically running the biometrics application program. The invention also correlates to the commonly assigned patents: (a) U.S. patent application Ser. No. 10/998,722 (US20050144464A1), filed on Nov. 30, 2004, and entitled "MEMORY STORAGE DEVICE WITH A FINGERPRINT SENSOR AND METHOD FOR PROTECTING THE DATA THEREIN"; (b) U.S. patent application Ser. No. 11/115,212 (US20050244037A1), filed on Apr. 27, 2005 and entitled "PORTABLE ENCRYPTED STORAGE DEVICE WITH BIOMETRIC IDENTIFICATION AND METHOD FOR PROTECTING THE DATA THEREIN"; and (c) U.S. patent application Ser. No. 11/131,276 (US20050210271A1), filed on May 18, 2005, and entitled "ELECTRONIC IDENTIFICATION KEY WITH PORTABLE APPLICATION PROGRAMS AND IDENTIFIED BY BIOMETRICS AUTHENTICATION".

2. Description of the Related Art

In the prior art, the exhibit, such as an identification card, a driver's license, or the like, is the simplest way to represent the personal identification, and the personal photo, characters and numbers are recorded on the exhibit. However, the identification card can be easily counterfeited, and several criminal acts have been induced accordingly.

An advanced method is to utilize the magnetic-stripe card to record the personal data. Similarly, the advanced technology makes the magnetic-stripe card be easily cracked.

The newest method is to utilize the chip card to protect the personal data. Basically, the password protection is frequently used to protect the personal data of the memory chip. However, using the password to protect the personal data is troublesome because the user tends to forget the password and the password may also be easily copied and attacked.

Meanwhile, the above-mentioned device (exclusive of the chip card) for representing the personal identification only can execute a single function and a single application.

U.S. Patent Publication No. 2003/0110389 A1 discloses a personal ID electric device similar to a solid-state mobile disk, wherein the device contains encrypted personal data and can be directly connected to the computer system. However, this device has to be enabled after the password is checked and thus encounters the above-mentioned problems. A best way to solve the problem is to provide a complete and effective data protection method based on the identification of the biometrics features, such as the fingerprint, voice, signature, eye iris, and the like. The advantages are that the biometrics feature is always kept on the user and the user does not need to memorize the feature, the biometrics feature cannot be stolen, and the fingerprint biometrics feature protection method is strict and very convenient.

Recently, owing to the invention of the chip-type fingerprint sensor, the miniaturized electrical product incorporated with the fingerprint identification device becomes the technology that can be implemented. The associated technology can be found in the following patents to one of the inventors: (a) U.S. patent application Ser. No. 10/403,052 (US20030190061A1), filed on Apr. 1, 2003, entitled "CAPACITIVE FINGERPRINT SENSOR"; (b) U.S. patent application Ser. No. 10/434,833 (US20030215976A1), filed on May 13, 2003, entitled "PRESSURE TYPE FINGERPRINT SENSOR FABRICATION METHOD"; (c) U.S. patent application Ser. No. 10/414,214 (US20040208345A1), filed on Apr. 16, 2003, and entitled "THERMOELECTRIC SENSOR FOR FINGERPRINT THERMAL IMAGING"; and (d) U.S. patent application Ser. No. 10/638,371 (US20040046574A1), filed on Aug. 12, 2003, and entitled "CAPACITIVE MICRO PRESSURE SENSING MEMBER AND FINGERPRINT SENSOR USING THE SAME". Thus, span personal applications, such as the portable electrical products with the fingerprint identification function, have been developed.

U.S. Pat. No. 4,582,985 issued on Apr. 15, 1986 has disclosed a personal data protection method, in which the personal data stored in the ID card device is protected by way of fingerprint authentication. The protected data stored in the card device can be outputted for the subsequent processing or authentication procedures only after the fingerprint identification procedure passes. The dimension of this device is the same as that of the generally used credit card. This device, which is a completely independent fingerprint identification device because the fingerprint capture and identification are performed in the same device, includes a fingerprint sensor, an image processing and identification module, and a memory.

Similarly, EP124079A1 also discloses a data protection concept similar to the '985 patent except that the communication interface thereof is a golden finger interface used in a SD card. In addition, the memory device of the '079 patent has a fingerprint identification module, and the data protection concept is the same as the '018 patent. Similarly, US2001/0023375A1 also discloses a method of protecting the data stored in the hard disk or flash disk according to the fingerprint identification.

WO 02/42887A2 patent discloses a data protection concept similar to the '985 patent and '079 patent except that the device of the '887 patent communicates the terminal system through the USB interface. This device is similar to the flash memory hard disk popularized in the current market except for the independent fingerprint processing and identifying module.

U.S. Patent publication number 2003/005337 discloses the data protection concept of an independent fingerprint identification module, which is the same as the '985 and '079 patents, and utilizes the USB as the communication interface, which is the same as that disclosed in the '887 patent. Similarly, the device of '337 patent is also an independent fingerprint identification device.

GB2387933 patent also discloses an independent fingerprint identification device, which has a concept and device design almost similar to those of the '887 and '337 patents, wherein the fingerprint capture and identification are performed in the same device.

Heretofore, in the above-mentioned fingerprint identification devices, the '985 patent discloses the application to the personal identification card, while the other patents are only used to protect data.

In addition, the basic requirement of the above-mentioned portable storage devices with the fingerprint identification function is to facilitate the user to connect one of these storage devices to various computer systems. However, even if the USB interface is used, the fingerprint related application program still has to be manually executed in the computer system first before it is used such that the computer system can provide a human-machine interface for the user. The conventional method is to provide an optical disk to execute the fingerprint related application program and enable the storage device to be used. In this case, each time when the computer systems are firstly set, the user has to carry the portable storage device together with the optical disk so that he or she can use the storage device in other computer systems.

To sum up, the object of the above-mentioned prior arts is to provide a storage device for protecting data stored therein by way of fingerprint identification. When the device is used, the user has to execute the fingerprint application software in the terminal system in advance. Thus, the fingerprint application program of the storage device cannot be conveniently used in a plug-and-play manner over various computers.

Thus, the Ser. No. 10/998,722 application discloses a storage device capable of enabling the operation system of the terminal system to automatically run the fingerprint application program by simulating a specific block of the memory module as a CD-ROM booting area, in which the fingerprint application program is stored, so as to achieve the function of automatically running the application program.

The Ser. No. 11/131,276 application also discloses a storage device having a fingerprint sensor and several portable application programs to serve as an electronic ID key for representing a personnel's ID. The ID key can be used in various terminal systems by automatically running the fingerprint application program.

In addition, the Ser. No. 11/115,212 patent discloses a hard drive, which can be plugged and played over various computers according to the advantage of automatically running the fingerprint application program in the above-mentioned two applications.

To extend the innovation technology, the invention provides methods of dividing the storage space and automatically running the biometrics application program in a portable storage device.

SUMMARY OF THE INVENTION

It is therefore an object of the invention to provide a portable storage device capable of automatically running biometrics application programs, wherein the portable storage device carries the biometrics application programs and the associated firmware such that the portable storage device can be plugged and played in various terminal hosts and then guide the user to perform the biometrics identification procedure.

To achieve the above-identified object, the invention provides a portable storage device including a control module, a biometrics sensor and a storage unit. The control module includes a microprocessor, a random access memory (RAM) and a read only memory (ROM). The RAM serves as a working memory for data processing, the ROM stores firmware for enabling the storage device to work, and the control module has a host interface to be electrically connected to a terminal host. The biometrics sensor is electrically connected to the control module. The storage unit is electrically connected to the control module through a standard interface. The firmware stored in the control module enables the storage unit, the biometrics sensor and the terminal host to communicate with one another. The firmware is configured: to divide the storage unit into a plurality of blocks, which comprises a biometrics application program (AP) block designed as a compact disk drive and a public block designed as a disk, wherein the biometrics application program block stores at least one biometrics application program; and to enable an operation system of the terminal host to treat the biometrics application program block as the compact disk drive after the control module is connected to the terminal host, to automatically run the at least one biometrics application program as a background AP, to disable or close the compact disk drive and enable the operation system to treat and access the public block as a first disk.

The invention also provides a portable storage device including a control module, a biometrics sensor and a storage unit. The control module includes a microprocessor, a random access memory (RAM) and a read only memory (ROM). The RAM serves as a working memory for data processing, the ROM stores firmware for enabling the storage device to work, and the control module has a host interface to be electrically connected to a terminal host. The biometrics sensor is electrically connected to the control module. The storage unit is electrically connected to the control module through a standard interface. The firmware stored in the control module enables the storage unit, the biometrics sensor and the terminal host to communicate with one another. The firmware is configured: to divide the storage unit into a plurality of blocks, which comprises a biometrics application program block, which is designed as a compact disk drive and stores at least one biometrics application program, and a private block; to enable an operation system of the terminal host to treat the biometrics application program block as a compact disk drive after the control module is connected to the terminal host, and to automatically run the at least one biometrics application program as a foreground program to immediately guide a user to perform a biometrics identification procedure; and to enable the firmware to enable the operation system to disable or close the compact disk drive and treat and access the private block as a disk after the user passes the biometrics identification procedure.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention.

DETAILED DESCRIPTION OF THE INVENTION

Figure 1:
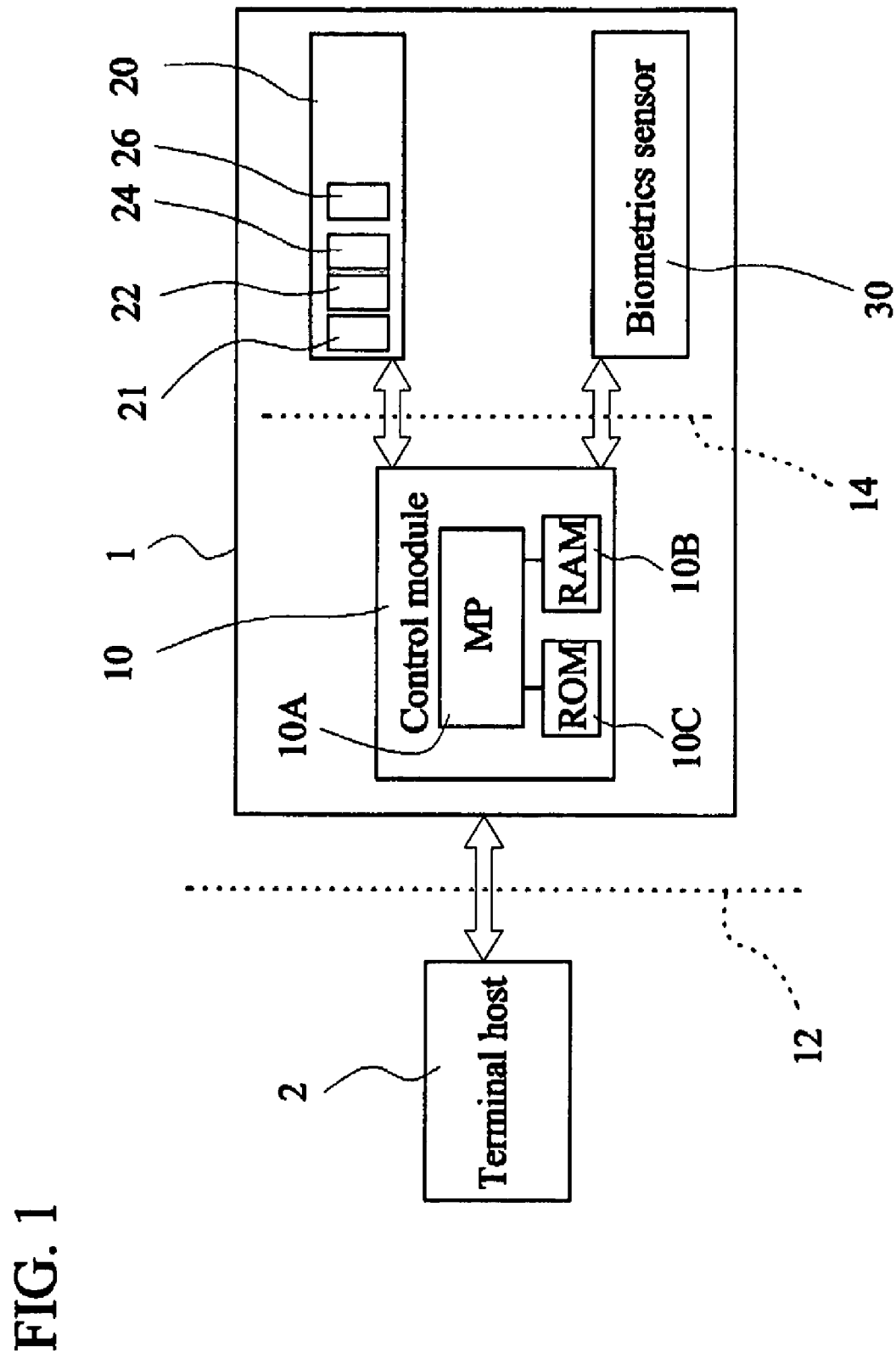
FIG. 1 is a schematic block diagram showing a portable storage device according to a first embodiment of the invention.

FIG. 1 is a schematic block diagram showing a portable storage device 1 according to a first embodiment of the invention. Referring to FIG. 1, the portable storage device 1 basically includes a control module 10, a storage unit 20 and a biometrics sensor 30. The control module 10 has a host interface 12 to be connected to a terminal host 2. The storage unit 20 is electrically connected to the control module 10 through a standard interface 14. The storage unit 20 stores at least one biometrics application program. The biometrics sensor 30 is electrically connected to the control module 10 through the standard interface 14 or any other interface (e.g., a serial peripheral interface (SPI) interface). The biometrics sensor 30 in this embodiment is a fingerprint sensor, particularly a chip-type fingerprint sensor including an area type and a sweep type fingerprint sensor. The biometrics sensor 30 also may be any other type of sensor, such as a voice sensor, an optical image sensor like CCD or CMOS image sensor for face recognition or an iris pattern sensing or any other biometrics sensor like finger or palm vein sensor. The host interface 12 is a universal serial bus (USB) interface in this embodiment, and may be a PCMCIA interface, a PCI express interface, an IEEE 1394 interface, a SATA interface or any other standard interface. The storage unit 20 is a non-volatile memory, which is a flash memory in this embodiment, and may be a programmable read only memory (PROM), a read only memory (ROM) or an electrically erasable programmable read only memory (EEPROM). Alternatively, the storage unit 20 may be, for example, a hard drive or a readable/writable optical drive.

The control module 10 includes a microprocessor (MP) 10A, a random access memory (RAM) 10B and a read only memory (ROM) 10C. The RAM 10B serves as a working memory for data processing, and the ROM 10C stores firmware to enable the storage device to work. That is, the control module 10 stores the firmware for communicating the storage unit 20, the biometrics sensor 30 and the terminal host 2 with one another. In order to achieve the effect of the invention, the firmware is configured to divide the storage unit 20 into a plurality of blocks, which includes at least one biometrics application program block 21, a public block 22 designed as a disk (e.g., a removable disk), and at least one private block 24. The at least one biometrics application program block 21 stores at least one biometrics application program and is designed as a compact disk drive. The private block 24 is designed as a disk. Alternatively, the blocks may further include at least one hidden block 26. The firmware is configured to design the public block 22 as a disk such that the public block 22 may be accessed before the biometrics identification procedure passes. The hidden block 26 is designed to store a key for the encryption/decryption application program and a biometrics feature template. Of course, the hidden block 26 may also be combined with the biometrics application program block 21.

The firmware is further configured to enable an operation system of the terminal host 2 to treat the at least one biometrics application program block 21 as a compact disk drive after the control module 10 is connected to the terminal host 2. The operation system can automatically run or execute the at least one biometrics application program in the compact disk drive as a background AP according to the booting technology of the compact disk drive. This firmware is further configured to disable/close the compact disk drive and enable the operation system to treat and access the public block as a first disk. Then, when the background AP is being called, the at least one biometrics application program guides a user to enter a biometrics identification procedure. After the biometrics identification procedure passes, a specific operation is enabled such that the firmware enables the private block to be treated and accessed as a second disk. In addition, the AP and contents may disappear after the control module 10 is disconnected from the terminal host 2 when the running AP does not detect the storage device.

The biometrics application program guides a user to perform the biometrics identification procedure using the method including, without limitation to, the representation of voice, texts and pictures. The specific operation includes, without limitation to, accessing the specific block in the storage unit 20, enabling an application program, such as an E-mail program, a file transfer program, a website login and authentication program, in the operation system of the terminal host 2.

In this embodiment, the operation system runs the biometrics application program as a background AP. When the user wants to execute the specific operation, he or she can execute a biometrics identification procedure through the background AP. Thus, the background AP may be disposed in a system tray, a mouse right button menu or an application program menu in the operation system. In other words, the system tray at the lower right corner of the window shows an icon which can be called by the user. Alternatively, when the user presses the right button of the mouse, an AP-menu of specific operations can be shown. Alternatively, the AP-menu may be embedded into the functional block of some application program (e.g. E-mail program, web explorer . . . ) in the operation system.

In a usage procedure, for example, after the portable storage device 1 is connected to the terminal host 2, the terminal host 2 treats the biometrics application program block 21 as a compact disk drive. If the file explorer in the operation system of the terminal host 2 is opened, the file explorer shows a compact disk drive. Thus, the operation system of the terminal host 2 can automatically run the biometrics application program, which is stored in the biometrics application program block 21, as a background AP. After the background AP is completely executed, the firmware disables or closes the compact disk drive, and to show the public block 22, which is treated as a first disk. Thus, the file explorer of the operation system can show the contents of the first disk representative of the public block 22. For the sake of simplicity, the first disk is referred to as a "D" drive. The public block 22 can be freely accessed without any biometrics identification procedure. The biometrics application program guides the user to perform the biometrics identification procedure through the calling of the background AP. After the biometrics identification procedure passes, the private block 24 is enabled, and the operation system treats the private block 24 as the second disk. Thus, the file explorer in the operation system can show the second disk (hereinafter referred to as an "E" drive) representative of the private block 24. It is to be noted that the drives D and E can commonly exist in the file explorer of the operation system in one architecture. In another architecture, only the drive D or E can be shown in the file explorer of the operation system. That is, the drive D (public block 22) has to be closed and then the drive E (private block 24) is shown. Alternatively, the drive D (public block 22) has to be disabled or closed and then another drive D (private block 24) is shown. In this case, the specific operation is to disable or close the public block 22 that is accessed as the disk and to enables the private block 24 to be treated and accessed as a disk.

In addition, the firmware and the background AP are designed to intercept or remove a warning message with the meaning like the sentence "USB device is not removed safely", which is generated by the operation system when the compact disk drive storing the to-be-run biometrics application program is closed or disabled and the public block 22 appears. In this case, for example, the "Windows 2000" operation system generates the warning message, and the firmware and the biometrics application program in this device cooperate with each other to intercept or remove the warning message.

Figure 2:
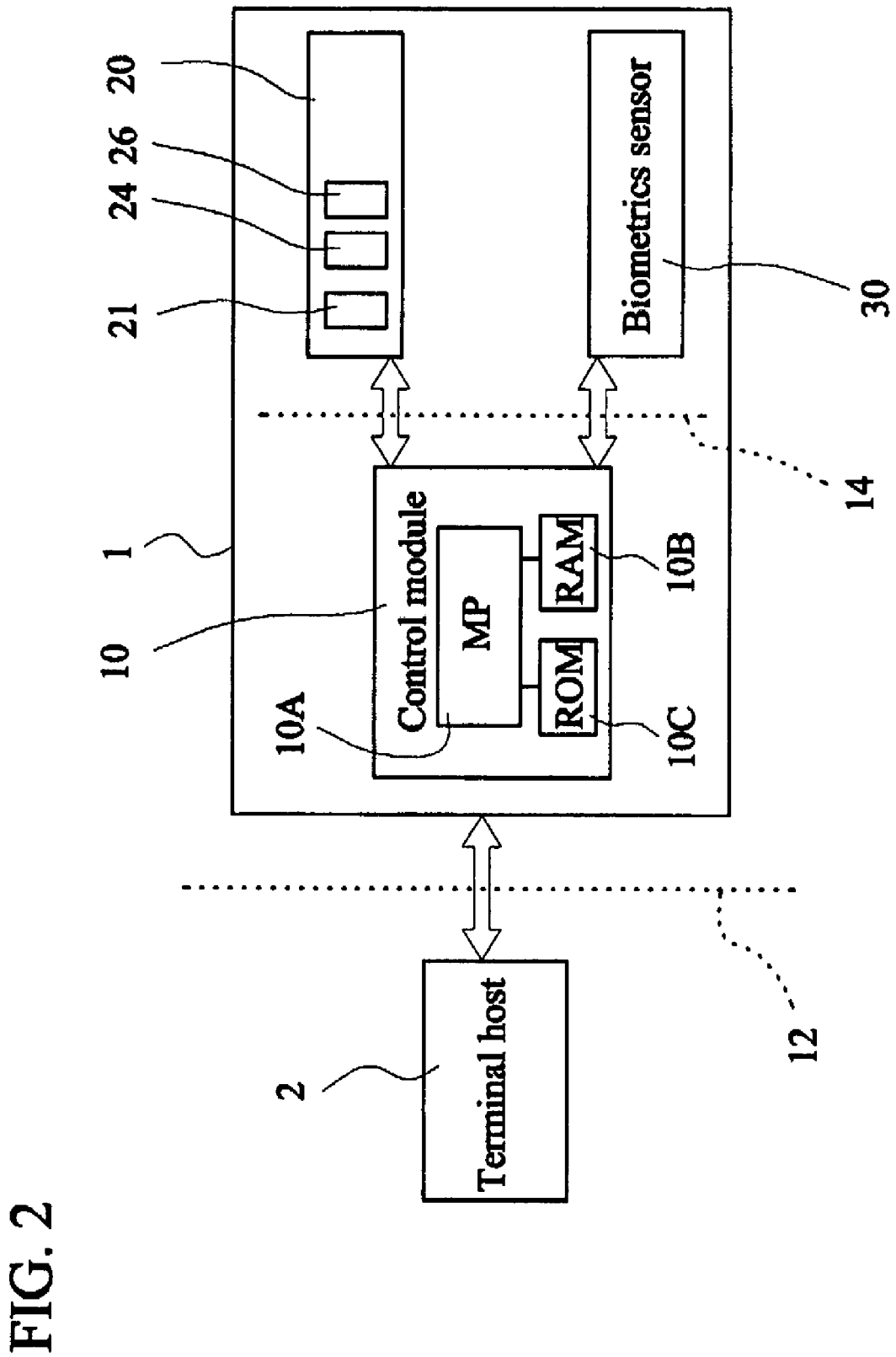
FIG. 2 is a schematic block diagram showing a portable storage device according to a second embodiment of the invention.

FIG. 2 is a schematic block diagram showing a portable storage device according to a second embodiment of the invention. As shown in FIG. 2, this embodiment is similar to the first embodiment except that the storage unit 20 of this embodiment has no public block. Taking a usage flow as an example, after the portable storage device 1 is connected to the terminal host 2, the terminal host 2 treats the biometrics application program block 21 as a compact disk drive. If the file explorer of the operation system of the terminal host 2 is opened, a compact disk drive is shown in the file explorer. Thus, the operation system of the terminal host 2 can automatically run the biometrics application program, which is stored in the biometrics application program block 21 (compact disk drive), as a foreground program. The foreground program immediately guides the user to perform the biometrics identification procedure. After the biometrics identification procedure passes, the firmware closes or disables the compact disk drive and switch from the compact disk drive to the private block 24. At this time, the private block 24 is treated as a disk. In other words, the file explorer of the operation system can show the disk (hereinafter referred to as the "D" drive) representative of the private block 24. Herein, the specific operation enables the operation system to access the private block 24 as the disk.

Figure 3:
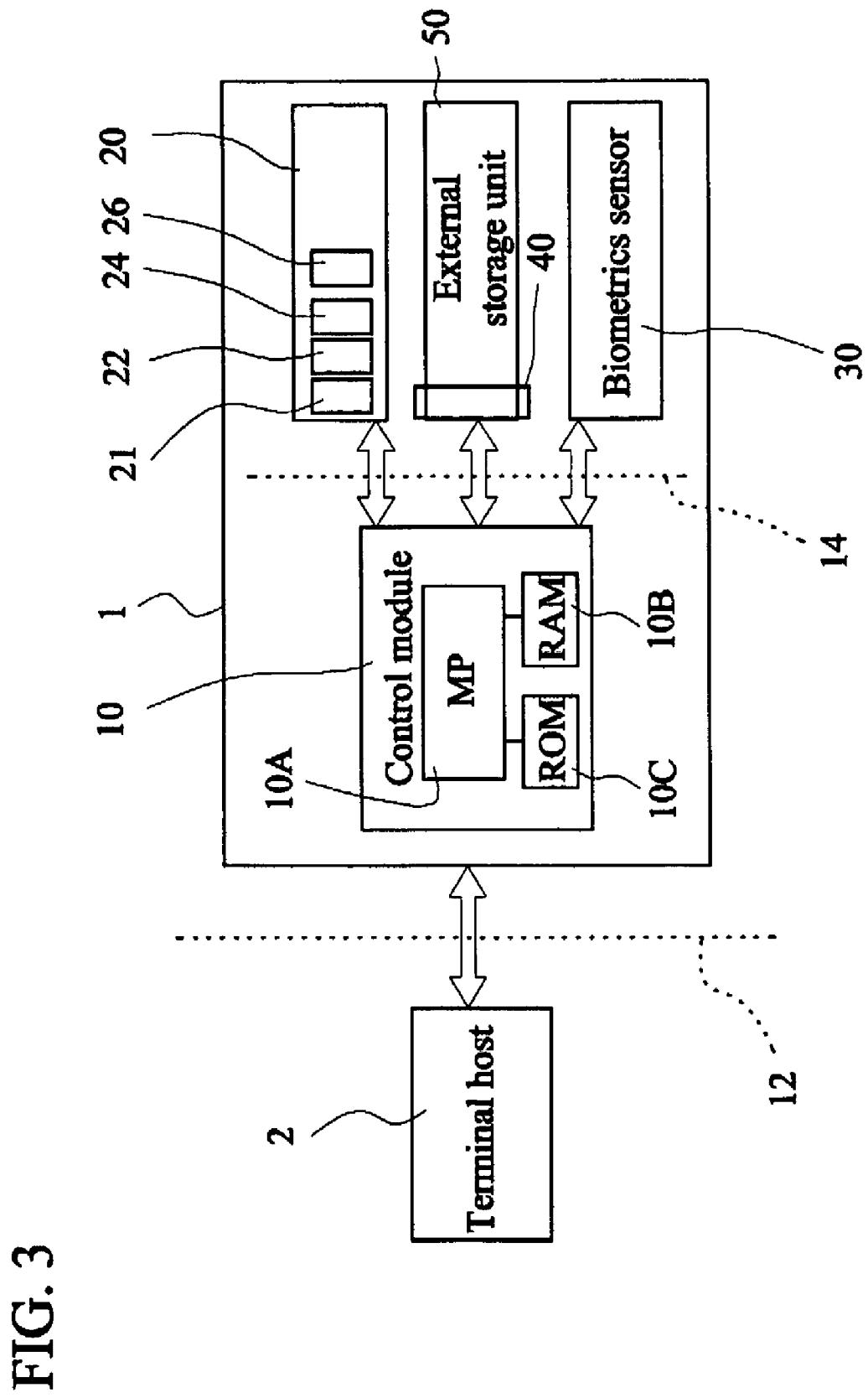
FIG. 3 is a schematic block diagram showing a portable storage device according to a third embodiment of the invention.

FIG. 3 is a schematic block diagram showing a portable storage device according to a third embodiment of the invention. As shown in FIG. 3, this embodiment is similar to the first embodiment except that the portable storage device 1 further includes an expansion slot 40 for connecting an inserted external storage unit 50 to the control module 10. The expansion slot 40 substantially expands the storage capacity of the invention device, or the invention device is treated as a storage reader for an external storage unit 50, which may be, for example, a CF card, a smart media, a memory stick, any other external storage unit with the standard interface, or a hard disk (especially a 1" or smaller hard drive called as a microdrive). The expansion slot 40 electrically connected to the control module 10 through the standard interface 14 is electrically connected to the external storage unit 50 in order to enlarge the storage capacity of the storage device. After the external storage unit 50 is inserted into the expansion slot 40, the control module 10 formats the external storage unit 50 into a single expansion private block for storing additional to-be-protected data. Consequently, this device may provide any data protection method for the external storage unit 50. It is to be noted that the expansion slot 40 and the external storage unit 50 of FIG. 3 may be applied to the background AP condition of FIG. 1 or the foreground program condition of FIG. 2.

Figure 4:
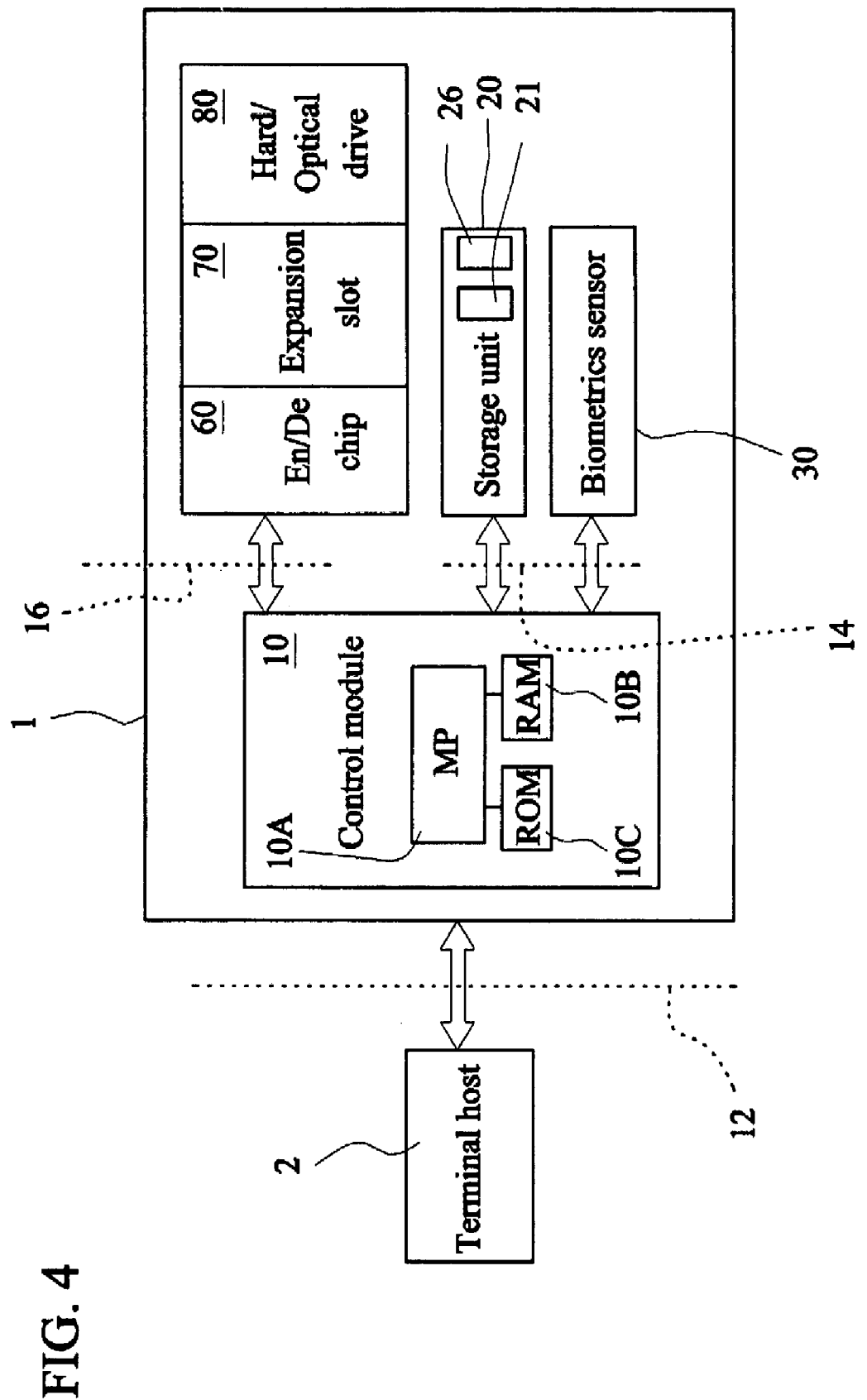
FIG. 4 is a schematic block diagram showing a portable storage device according to a fourth embodiment of the invention.

FIG. 4 is a schematic block diagram showing a portable storage device according to a fourth embodiment of the invention. As shown in FIG. 4, this embodiment is similar to the second embodiment pertaining to the foreground program condition except that the portable storage device 1 further includes an encrypting/decrypting chip (En/De chip) 60, a storage interface expansion slot 70 and a hard/optical drive 80, and the storage unit 20 has no private block. The encrypting/decrypting chip 60 is connected to the control module 10 through a storage interface 16. The storage interface expansion slot 70 is connected to the encrypting/decrypting chip 60. The hard/optical drive 80 is connected to the control module 10 through the storage interface expansion slot 70 and the encrypting/decrypting chip 60. In this embodiment, the specific operation is to enable the hard/optical drive 80 to be accessed by the terminal host 2. The terminal host 2 can access the hard/optical drive 80 through the encrypting/decrypting chip 60 and a key stored in the storage unit 20. In one embodiment, the hard/optical drive 80 is a magnetic hard drive, especially a 3.5" hard drive, a 2.5" hard drive or other hard drives with other sizes. In another embodiment, the hard/optical drive 80 is an optical drive for accessing CD-R/RW, DVD-R/RW and other optical disks with other specifications.

In addition, the control module 10 provides a standard interface 14 for connecting the storage unit 20 to the biometrics sensor 30. Meanwhile, the control module 10 provides a host interface 12, which is the same as the first embodiment and to be connected to the external terminal host 2. Each of the storage interface 16 and the storage interface expansion slot 70 in this embodiment is an IDE interface, and may be a SCSI interface, a serial ATA interface, a compact flash (CF) interface, a PCMCIA interface, an IEEE 1284 interface or any other standard interface.

The storage unit 20 is a non-volatile memory, which is a flash memory in this embodiment and may be a programmable read only memory (PROM), a read only memory (ROM) or an electrically erasable programmable read only memory (EEPROM) in another embodiment.

In one embodiment of the invention, the invention device may have an integrated single chip including the control module 10, encrypting/decrypting chip 60, the storage unit 20 and the biometrics sensor 30 formed completely or partly into the system-on-chip (SOC) architecture so as to reduce the cost.

The storage unit 20 is divided into a biometrics application program block 21 for storing at least one biometrics application program, and a hidden block 26 for storing at least one biometrics template and a key for the encrypting/decrypting chip 60. The biometrics template is the data encrypted using the key. The encrypting/decrypting chip 60 is connected to the control module 10 through the storage interface 16.

Taking a usage procedure as an example, after the portable storage device 1 is connected to the terminal host 2, the terminal host 2 treats the biometrics application program block 21 as a compact disk drive. If the file explorer of the operation system of the terminal host 2 is opened, a compact disk drive is shown in the file explorer. Thus, the operation system of the terminal host 2 can automatically run the biometrics application program, which is stored in the biometrics application program block 21 (compact disk drive), as a foreground program. The foreground program guides the user to perform the biometrics identification procedure. After the biometrics identification procedure passes, the firmware disables or closes the compact disk drive and switches from the compact disk to the hard/optical drive 80. Meanwhile, the control module 10 transfers the key for the encrypting/decrypting chip 60 from the storage unit 20 to the encrypting/decrypting chip 60 so that the portable hard/optical drive is immediately accessed using an encrypting and decrypting engine. At this time, the operation system of the terminal host treats and accesses the hard/optical drive 80 as a disk. In other words, a disk (hereinafter referred to as a "D" drive) representative of the hard/optical drive 80 is shown in the file explorer of the operation system.

The encrypting/decrypting chip of this device uses a symmetrical algorithm including the DES (data encrypt standard), the triple DES (triple encrypt data encrypt standard) or AES. The encrypting/decrypting chip can immediately process the data of 1.6 Gbits/sec, so no time delay is caused when the hard/optical drive is being accessed, it is more effective than the method of encrypting/decrypting using software, and it is more difficult to be cracked than that using software. Of course, in order to save the cost, the hardware encrypting/decrypting chip in this invention may also be omitted, and the software encrypting/decrypting mechanism is added. In this embodiment, the hard/optical drive 80 is connected to the control module 10 directly through the storage interface 16 without any storage interface expansion slot 70.

In addition, the advantage of the encrypting/decrypting method of the invention is that the key for the encrypting/decrypting engine is not stored in the encrypting/decrypting chip. Instead, the key is outputted from the hidden block 26 of the storage unit 20 after the biometrics identification and comparison. The data in the hidden block 26 is encrypted according to the personal biometrics feature, and cannot be cracked and accessed. In order to enhance the security, the key may further be arbitrarily generated by software and vary with time.

The biometrics identification procedure may run in the terminal host 2. In this case, the biometrics application program may include a biometrics identification program for identifying or comparing, for example. Alternatively, the biometrics identification procedure may also run in the portable storage device 1, as will be discussed in the following.

Figure 5:
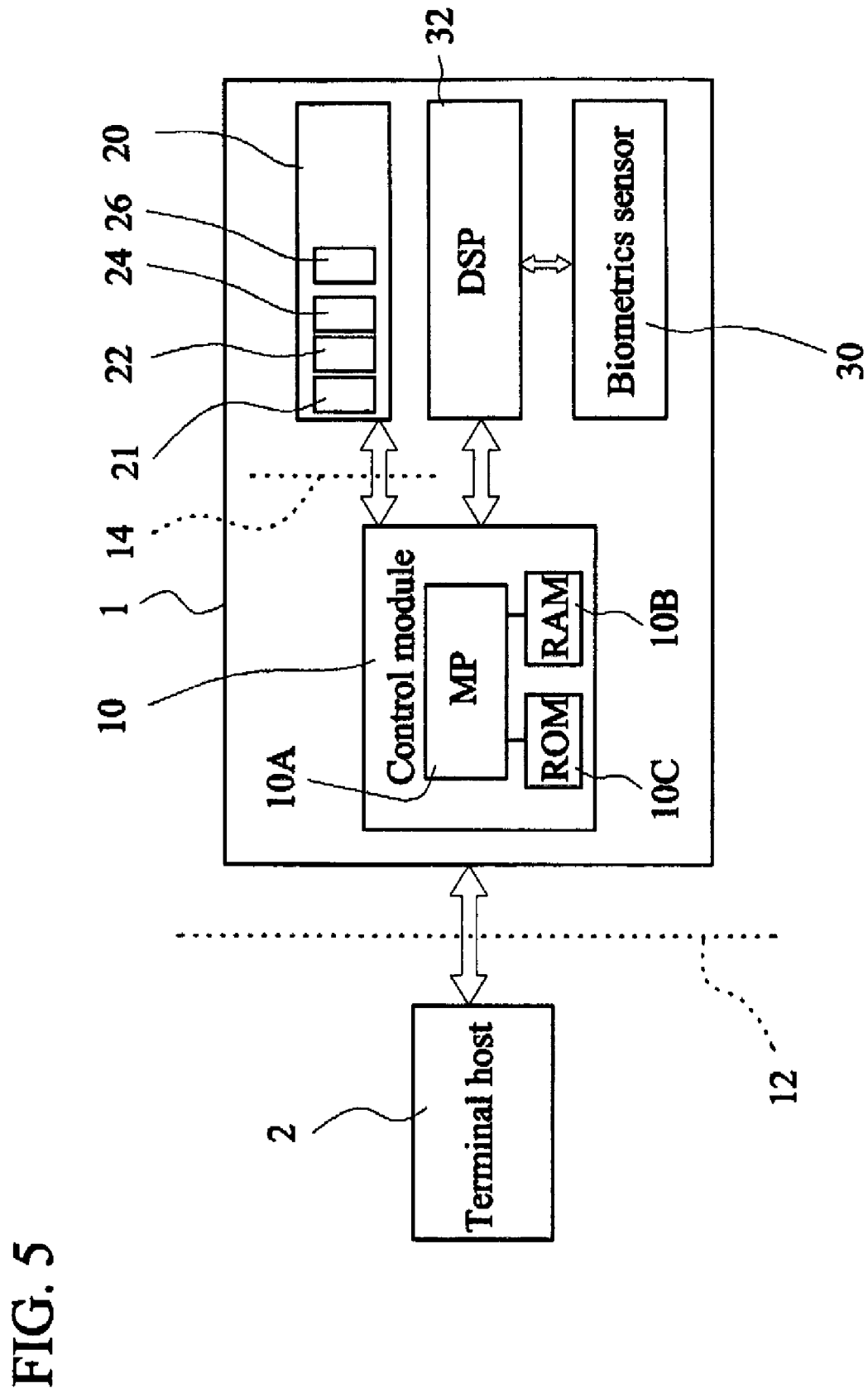
FIG. 5 is a schematic block diagram showing a portable storage device according to a fifth embodiment of the invention.

FIG. 5 is a schematic block diagram showing a portable storage device according to a fifth embodiment of the invention. As shown in FIG. 5, the portable storage device 1 of this embodiment is similar to the second embodiment except that the biometrics sensor 30 is connected to the control module 10 through an identification processor 32 of a digital signal processor, wherein the processor 32 further includes a flash memory and a memory (RAM) respectively serving as a program memory and a working memory, and the digital signal processor 32 runs the biometrics identification procedure. After the biometrics identification procedure passes, the control module 10 may set the private block 24 of the storage unit 20 to be accessed by the terminal host 2, or send a signal to the terminal host 2 to inform the terminal host 2 that it can run the specific operation. The identification processor may also be integrated with the control module to form a single chip. The operation flow of this embodiment is as follows. After the portable storage device 1 is connected to the terminal host 2, the terminal host 2 treats the biometrics application program block 21 as a compact disk drive. If the file explorer of the operation system of the terminal host 2 is opened, the file explorer shows a biometrics application program block 21 treated as a compact disk drive. Thus, the operation system of the terminal host 2 can automatically run the biometrics application program stored in the biometrics application program block 21 as a foreground program or a background AP.

In the foreground program condition, the terminal host 2 treats the biometrics application program block 21 as a compact disk drive, and automatically runs the biometrics application program having the human-machine interface to guide the user to use the biometrics sensor 30. The biometrics sensor 30 senses the biometrics feature data of the user and transfers the biometrics feature data to the digital signal processor 32, which identifies the biometrics data. After the identification passes, the compact disk drive closes or disables, and the file explorer of the operation system can show the contents of the disk (hereinafter referred to as a "D" disk) representative of the private block 24.

In the background AP condition, the compact disk drive closes or disables after the background AP has been completely executed, and the file explorer of the operation system shows the contents of the first disk (hereinafter referred to as a "D" drive) representative of the public block 22, wherein the drive D can be freely accessed without any biometrics identification procedure. The biometrics application program provides a human-machine interface to guide the user to perform the biometrics identification procedure through the calling of the background AP. Then, the biometrics sensor 30 senses the biometrics feature data of the user and transfers the feature data to the digital signal processor 32, which identifies the biometrics data. After the identification passes, the file explorer of the operation system can show the contents of the second disk (hereinafter referred to as an "E" drive) representative of the private block 24.

It is to be noted that the drives D and E can commonly exist in the file explorer of the operation system in one architecture. In another architecture, the file explorer of the operation system only can show one drive, that is, the file explorer has to close or disable the drive D (public block 22) and then switch from the drive D to the drive E (private block 24), or to close or disable the drive D (public block 22) and then switch to another drive D (private block 24).

In another embodiment of the invention, the firmware may further be configured to divide the storage unit 20 into at least one biometrics application program block 21, at least one public block 22, at least one private block 24 and at least one hidden block 26, which is not essential. The information of the public block 22 is shown after the control module 10 is connected to the terminal host 2, and the specific operation is to make the private block 24 accessible. The hidden block 26 is configured to store the data including the key for the encryption/decryption software (included in the AP) and the encryption/decryption of the biometrics feature template. Of course, the hidden block 26 may also be configured to combine with the biometrics application program block 21.

In addition, the method of removing of the warning message is also the same as that mentioned hereinabove, and detailed descriptions will be omitted.

Figure 6:
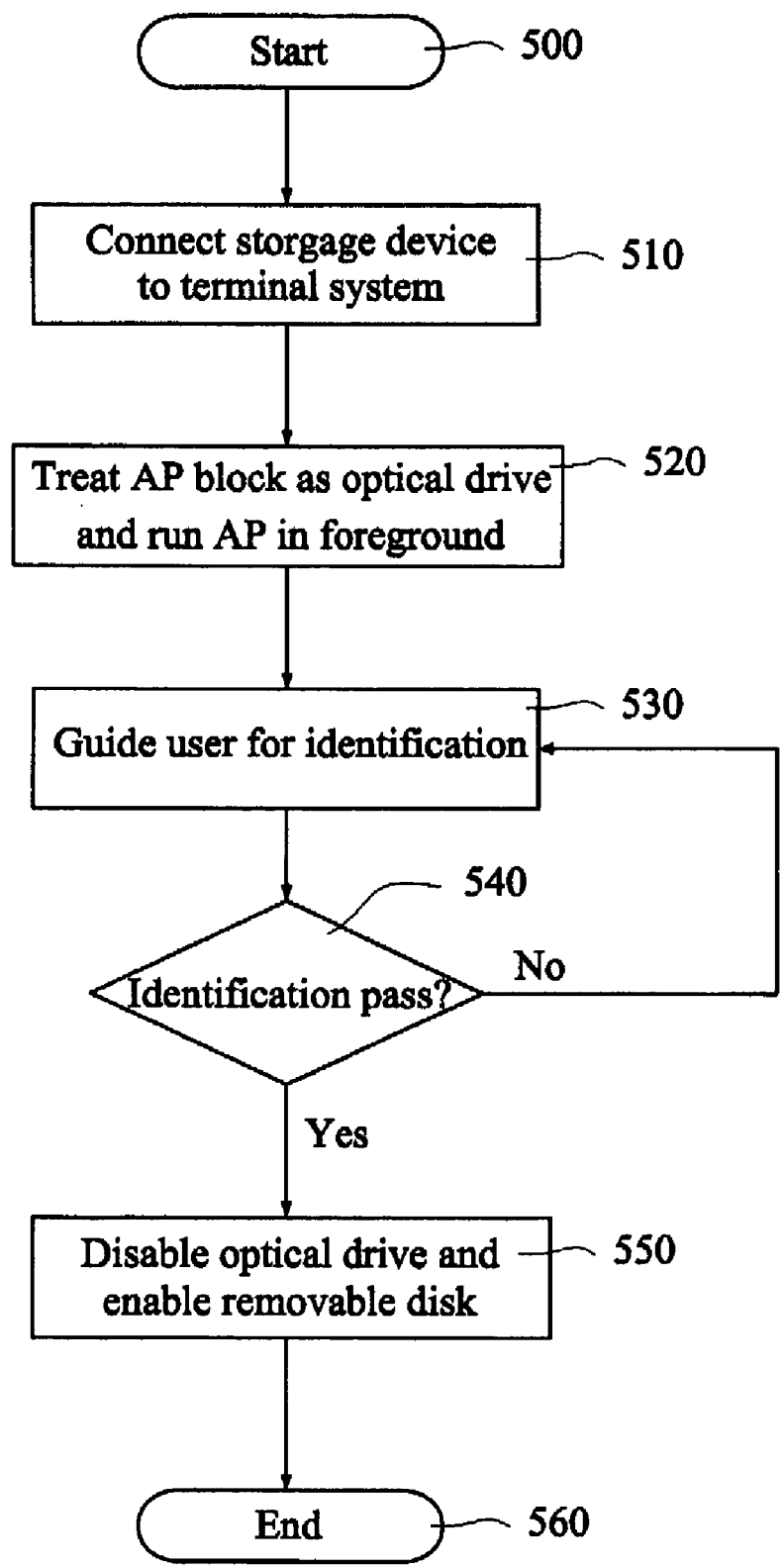
FIG. 6 is a flow chart showing a method of automatically running a biometrics application program according to a sixth embodiment of the invention.

FIG. 6 is a flow chart showing a method of automatically running a biometrics application program according to a sixth embodiment of the invention. As shown in FIG. 6, this method includes the following steps.

Step 500 starts.

Step 510 connects the storage device to the terminal host through the host interface of the storage device.

Step 520 enables the operation system of the terminal host to treat the at least one biometrics application program block as a compact disk drive and to automatically run the at least one biometrics application program stored in the compact disk drive so as to guide the user to perform the identification procedure. This biometrics application program runs in the foreground and is thus called as a foreground program.

Step 530 enables the biometrics application program to guide the user to perform the biometrics identification procedure.

Step 540 judges whether the biometrics identification procedure successes. If yes, the procedure jumps to step 550, or otherwise the procedure goes back to step 530.

Step 550 closes or disables the biometrics application program block treated as the compact disk drive and enables a specific operation after the biometrics identification procedure successes. In this embodiment, the specific operation is to switch to the private block, that is, to enable the operation system to treat the private block as a disk. In another embodiment corresponding to FIG. 4, the operation system can treat and access a hard/optical drive of the storage device as a disk.

Step S560 ends.

It is to be noted that all the operation methods and procedures according to the first to fifth embodiments of the invention can be properly adopted in this embodiment.

Figure 7:
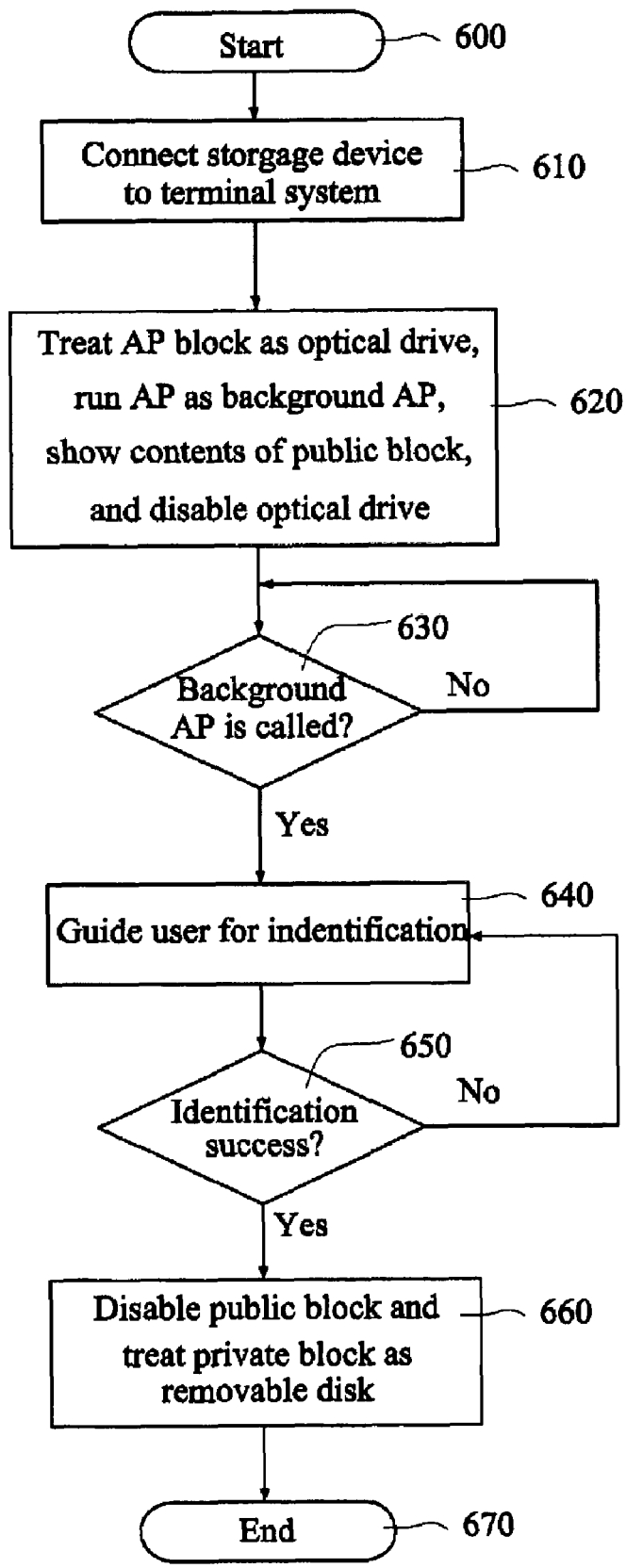
FIG. 7 is a flow chart showing a method of automatically running a biometrics application program according to a seventh embodiment of the invention.

FIG. 7 is a flow chart showing a method of automatically running a biometrics application program according to a seventh embodiment of the invention. As shown in FIG. 7, this method includes the following steps.

Step 600 starts.

Step 610 connects the storage device to the terminal host through the host interface of the storage device.

Step 620 enables the operation system of the terminal host to show at least one biometrics application program block as a compact disk drive, and automatically run at least one biometrics application program to generate a background AP. The background AP may be disposed in a system tray, a mouse right button menu or an application program menu in the operation system. After the generation of the background AP completes, the biometrics application program block treated as a compact disk drive is closed or disabled and the content of the public block (hereinafter referred to as a "D" drive) is shown, wherein the drive D can be freely accessed without any biometrics identification procedure. In other words, the operation system treats the public block as a disk. This biometrics application program runs in the background, and is thus called as a background AP. Then, this biometrics application program is moved and runs at the foreground according to a calling signal of the user, as will be described in the following.

Step 630 detects whether the background AP is being called. If yes, the procedure jumps to step 640, or otherwise the detection of whether the menu is called continues in the background.

Step 640 shows the biometrics application program for the user to guide the user to perform the identification procedure.

Step 650 judges whether the biometrics identification procedure successes. If yes, the procedure jumps to step 660, or otherwise the procedure goes back to step 640.

Step 660 enables a specific operation after the biometrics identification procedure passes. In this embodiment, the specific operation is to switch to the private block, that is, to make the operation system treat the private block as another disk. For example, the file explorer of the operation system can show the contents of the second disk representative of the private block, and the drive may be labeled as the drive E or D.

Step S680 ends.

It is to be noted that all the operation methods and procedures according to the first to fifth embodiments of the invention can be properly adopted in this embodiment.

According to the portable storage device 1 of the invention, the user can carry the application program easily and the portable storage device 1 is suitable for various terminal hosts without manually executing the special application program. The user only has to plug the hardware without worrying about the execution of the software. Meanwhile, running the biometrics identification procedure can effectively protect the private data stored in the portable storage device 1.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A portable storage device, comprising:
   a control module having a microprocessor, a random access memory (RAM) and a read only memory (ROM), wherein the RAM serves as a working memory for data processing, the ROM stores firmware for enabling the storage device to work, and the control module has a host interface to be electrically connected to a terminal host;
   a biometrics sensor electrically connected to the control module; and
   a storage unit electrically connected to the control module through a standard interface, wherein:
   the firmware stored in the control module enables the storage unit, the biometrics sensor and the terminal host to communicate with one another;
   the firmware divides the storage unit into a plurality of blocks, the plurality of blocks has a biometrics application program (AP) block designed as a compact disk drive and a public block designed as a disk and the biometrics application program block stores at least one biometrics application program;
   the firmware enables an operation system of the terminal host to treat the biometrics application program block as the compact disk drive after the control module is connected to the terminal host, so that the operation system of the terminal host automatically runs the at least one biometrics application program, stored in the biometrics application program block, as a background AP;
   the firmware enables the operation system of the terminal host to close or disable the compact disk drive immediately after the at least one biometrics application program is run as the background AP and before the biometrics sensor senses biometrics feature data, and to treat and access the public block as a first disk.

2. The device according to claim 1, wherein the firmware and the background AP intercept or remove a warning message generated by the operation system when the compact disk drive is disabled or closed.

3. The device according to claim 1, wherein the blocks further comprise a private block, the at least one biometrics application program guides a user to perform a biometrics identification procedure when the background AP is being called, and the firmware enables the private block to be treated and accessed as a second disk after the biometrics identification procedure passes.

4. The device according to claim 3, wherein the firmware disables or closes the first disk and treats and accesses the private block as the second disk after the biometrics identification procedure passes.

5. The device according to claim 3, wherein the biometrics identification procedure runs in the terminal host.

6. The device according to claim 3, wherein the biometrics identification procedure runs in the portable storage device.

7. The device according to claim 6, wherein the biometrics sensor is connected to the control module through an identification processor, and the identification processor runs the biometrics identification procedure.

8. The device according to claim 1, wherein the storage unit is a non-volatile memory selecting from one of the group consisting of a flash memory, a programmable read only memory (PROM), a read only memory and an electrically erasable programmable read only memory (EEPROM), a hard disk or a readable/writable optical drive.

9. The device according to claim 1, further comprising:
an expansion slot for connecting an inserted external storage unit to the control module.

10. The device according to claim 1, wherein the background AP is disposed in a system tray, a mouse right button menu or an application program menu in the operation system.

11. A portable storage device, comprising:
a control module comprising a microprocessor, a random access memory (RAM) and a read only memory (ROM), wherein the RAM serves as a working memory for data processing, the ROM stores firmware for enabling the storage device to work, and the control module has a host interface to be electrically connected to a terminal host;
a biometrics sensor electrically connected to the control module; and
a storage unit electrically connected to the control module through a standard interface, wherein:
the firmware stored in the control module enables the storage unit, the biometrics sensor and the terminal host to communicate with one another;
the firmware divides the storage unit into a plurality of blocks, the plurality of blocks has a biometrics application program block and a private block, and the biometrics application program block is designed as a compact disk drive and stores at least one biometrics application program;
the firmware enables an operation system of the terminal host to treat the biometrics application program block as the compact disk drive after the control module is connected to the terminal host, so that the operation system of the terminal host automatically runs the at least one biometrics application program, stored in the biometrics application program block, as a foreground program to immediately guide a user to perform a biometrics identification procedure; and
the firmware closes or disables the compact disk drive after the user passes the biometrics identification procedure and treats and accesses the private block as a disk after the user passes the biometrics identification procedure.

12. The device according to claim 11, wherein the firmware enables the operation system of the terminal host to automatically remove the at least one biometrics application program, which is running, after the storage device is disconnected from the terminal host.

13. The device according to claim 11, wherein the firmware and the at least one biometrics application program intercept or remove a warning message generated in the operation system when the compact disk drive is disabled or closed.

14. The device according to claim 11, wherein the biometrics identification procedure runs in the terminal host.

15. The device according to claim 11, wherein the biometrics identification procedure runs in the portable storage device.

16. The device according to claim 15, wherein the biometrics sensor is connected to the control module through an identification processor, and the identification processor runs the biometrics identification procedure.

17. The device according to claim 11, wherein the storage unit is a non-volatile memory selecting from one of the group consisting of a flash memory, a programmable read only memory (PROM), a read only memory and an electrically erasable programmable read only memory (EEPROM), a hard disk or a readable/writable optical drive.

18. The device according to claim 11, further comprising:
an expansion slot for connecting an inserted external storage unit to the control module.

* * * * *